No. 850,729. PATENTED APR. 16, 1907.
W. E. BURKS.
AUTOMATIC SCALE.
APPLICATION FILED MAY 12, 1906.
2 SHEETS—SHEET 1.
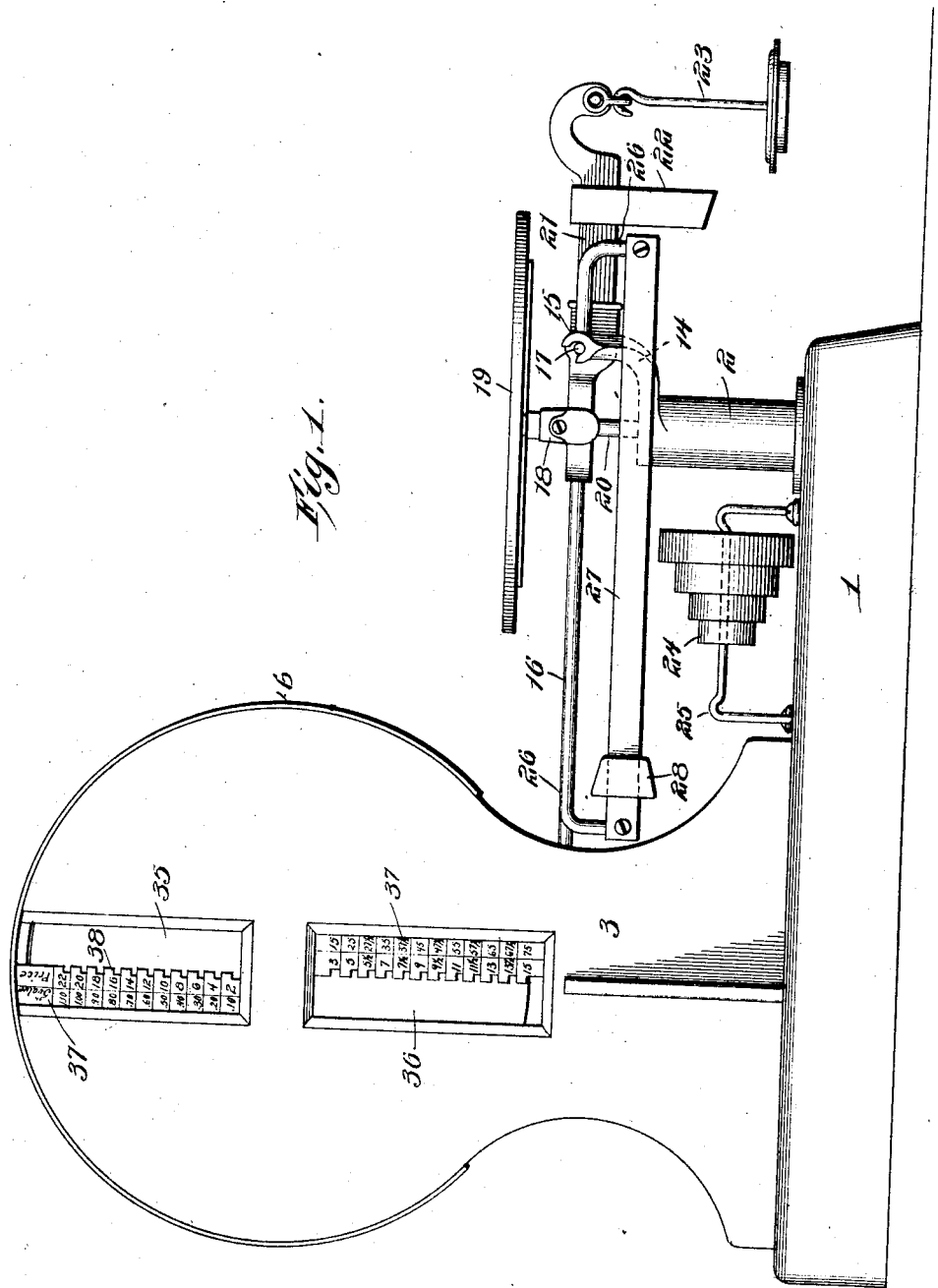

No. 850,729. PATENTED APR. 16, 1907.
W. E. BURKS.
AUTOMATIC SCALE.
APPLICATION FILED MAY 12, 1906.
2 SHEETS—SHEET 2.
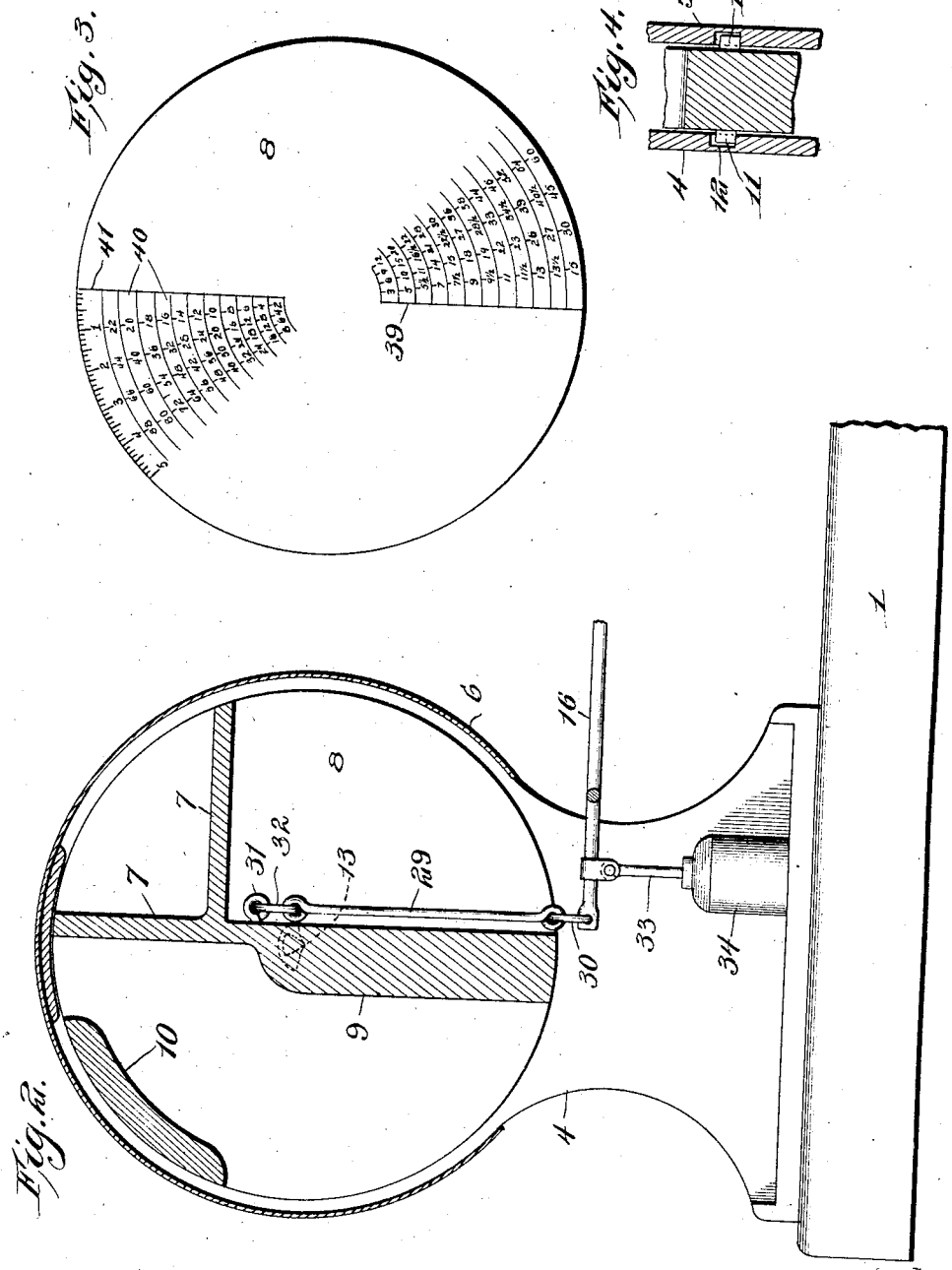
Witnesses
Louis R. Heinrichs
D. W. Gould.
Inventor
W. E. Burks
By Victor J. Evans
Attorney

UNITED STATES PATENT OFFICE.

WILLIAM E. BURKS, OF ASHLAND, KENTUCKY, ASSIGNOR OF ONE-HALF TO V. V. ADKINS, OF ASHLAND, KENTUCKY.

AUTOMATIC SCALE.

No. 850,729.          Specification of Letters Patent.          Patented April 16, 1907.

Application filed May 12, 1906. Serial No. 316,550.

*To all whom it may concern:*

Be it known that I, WILLIAM E. BURKS, a citizen of the United States, residing at Ashland, in the county of Boyd and State of Kentucky, have invented new and useful Improvements in Automatic Scales, of which the following is a specification.

The invention relates generally to an improvement in scales, and particularly to a computing-scale adapted to register the weight of any particular article and simultaneously indicate the price of that article.

The main object of the present invention is the construction of a computing-scale having a fixed scale-strip and a movable dial, the dial acting as a counterpoise to the article being weighed and indicating, in conjunction with the fixed scale structure, the weight of the article in pounds, and simultaneously indicating the total cost of the article in accordance with any particular price per pound noted on the fixed strip.

Another object of the invention is to provide the scale-beam with a holder for the reception of additional weights to further balance the beam when the article being weighed is in excess of the capacity of the dial, the fixed scale being arranged to indicate the total cost at varying amounts per pound of the excess weight of the article indicated by the additional counterpoise, whereby the capacity of the scale is practically unlimited.

The invention will be described in the following specification, reference being had particularly to the accompanying drawings, in which—

Figure 1 is a view in side elevation of a scale constructed in accordance with my invention. Fig. 2 is a vertical section through the dial-housing and dial, the forward portion of the scale being broken away. Fig. 3 is an elevation of the dial removed. Fig. 4 is a broken transverse section through the dial and housing, illustrating the dial-fulcrum.

Referring particularly to the drawings, wherein like reference-numerals indicate like parts throughout the several views, my improved scale comprises a base 1 of any desired size and material and carrying at the forward end a hollow standard 2 and at the rear end a scale-housing 3. The housing proper comprises plates 4 and 5, projecting in spaced parallel relation from the base, each being preferably of the contour illustrated to form, in effect, a circular housing supported above the base, the peripheral edges of the plates 4 and 5 throughout the circular portion being connected by a transversely-arranged strip 6, whereby to practically inclose the dial supported within the circular portion of the housing. The dial proper comprises a framework 7, upon which is fixed face-plates 8, preferably of circular form and of slightly less diameter than the interior diameter of the circular housing. The frame 7 of the dial is preferably enlarged, as at 9, to provide for normally maintaining the dial in a certain relative position, the dial being further provided with a counterweight or balance 10 to offset the counteracting weight of the forwardly-projecting portion of the scale-beam, as hereinafter described.

The scale is provided with laterally-extending centrally-arranged trunnions 11, having the usual knife edges and arranged to seat in recesses 12, formed in the approximate faces of the plates 4 and 5, the lower walls of said recesses being preferably provided with notches 13 for the reception of the bearing edges of the trunnions. By this arrangement the dial is supported centrally within the circular housing and is capable of relatively free revolution therein, owing to the support described.

The standard 2 is provided at the upper end with forwardly-projecting arms 14, which extend upwardly at their forward ends and are terminally provided with bearing-recesses 15. The scale-beam proper, 16, is provided with trunnions 17 of any approved type to seat within said bearing-recesses 15, and in rear of said trunnions—that is, intermediate the trunnions and dial-housing—the scale-beam is provided with a platform-frame 18, designed to support the usual platform for the reception of articles to be weighed. The platform shown is secured to the scale-beam directly above the standard 2 and is provided with a depending rod 20 to fit within the standard, the rod being provided, if desired, with a disk or head for loose contact with the interior wall of the standard for the usual guiding effect. The scale-beam projects forwardly beyond the trunnion 17 in the form of a bar 21, arranged for the reception of a counterbalance 22, which may slidably engage the bar and be held in fixed relation thereto by a set-screw or the like, the counterbalance serving to assist in counteracting the weight of the beam and connected parts in rear of the fulcrum. The forward end of the wall 20 is shaped in the usual manner to provide for the connection of the weight-holder 23, designed to receive any one of a series of weights 24 in the event the weight of the article is in excess of the capacity of the dial, as hereinafter described. The weights 24 are of the usual scale type and arranged, as is usual, for support from an ordinary frame, as 25, fixed to the base 1. The scale-beam is provided with laterally-extending arms 26, arranged to support a tare-beam 27, on which is slidably mounted a tare-weight 28 for the usual purpose. The rear of the scale-beam projects between the plates 4 and 5 of the housing below the circular portion thereof and is connected to one end of an operating-rod 29 through the medium of a link 30; the opposite end of the rod 29 being connected to an eye 31 through the medium of a link 32, the eye projecting forwardly from a frame of the dial and being disposed above the fulcrum-points thereof, so that depression of the rear end of the scale-beam will tend to revolve the dial on its fulcrum-support. Forward of the rear end the scale-beam is connected to a rod 33, formed at the lower end with a suitable disk-head to project within a receptacle 34, supported on the base 1 between the plates 4 and 5 of the housing and adapted to contain a quantity of fluid. This construction provides, in effect, a dash-pot for the rear end of the scale-beam, tending to minimize the movements of the dial under the influence of the scale-beam and to cause the parts to quickly reach a fixed relative position after initial movement under the influence of an article deposited on the platform.

So far as described the scale proper comprises a scale-beam fulcrumed upon a standard and connected at its rear end to a dial, the article-supporting platform being connected to the beam intermediate the dial and fulcrum. A weight-holder is provided forward of the fulcrum, so that weights deposited thereon will tend to counterbalance an article resting upon the platform.

As the scale of the present invention is of a computing nature, means must be provided whereby movement of the dial in addition to indicating in pounds and fractions thereof the weight of an article deposited upon the platform will also indicate the total cost of such article at any given price per pound. With this particular object in view the side plates 4 and 5 of the housing are formed with diametrically-arranged openings 35 and 36, preferably extending vertically of the housing, with the former opening extending from the upper edge of the circular portion of the housing to a point slightly above the center thereof, while the lower opening is similarly arranged in the lower portion of the circular housing. The openings are of an appropriate width for the purpose desired with their longitudinal centers in exact alinement with the vertical diameter of the circular portion of the housing, so that one-half of the longitudinal extent of each opening is arranged on each side of said diametric line. Secured to opposite walls of the upper and lower openings, respectively, is what I term the "fixed" scale 37, said scale being secured to that edge of the respective openings from which the dial travels in movement—that is, the rear edge of the upper opening and the forward edge of the lower opening. Each scale occupies approximately half the opening, so that the free edge of the scale-strip terminates in alinement with the vertical diameter of the circular portion of the housing hereinbefore referred to, said free edge of the strip being preferably formed with a series of indicating points or fingers 38. The scale-strip is divided into a number of vertical and horizontal columns by a series of longitudinal and transverse lines, the number of such columns being arranged to conform to the desired capacity of the scale, as hereinafter referred to. In the particular instance shown each strip is divided into two vertically-arranged columns and eleven transversely-arranged columns. The first vertical column—that is, the column next the free edge of the strip—is arranged to indicate the value of one pound of material at prices regularly increasing in definite ratios, in the particular instance the lower space of the column indicating two cents per pound and each successive space upwardly in the same column increasing by two cents, so that said column indicates a price per pound varying from two cents to twenty-two cents. The similar column in the lower scale contains a progressive series of price-marks beginning with the lowest price at the upper space and increasing throughout the column. In the instance of the lower strip the prices do not increase in regular proportion, being preferably arranged so that, in conjunction with the upper strip, practically all of the usual prices per pound are indicated. The second vertical column of each strip bears a definite relation to the prices of the first column of the strip, indicating in their respective spaces the price of a particular number of pounds—in the present instance five—based upon the price per pound indicated in the transversely-alined space of the first column, so that any particular series of spaces transverse the scale-strip will indicate in the first column the price of one pound and in the second column the cost of five pounds at said price. The fingers 38 register, of course, with the respective transversely-arranged columns, serving as an indicator to direct the attention of the user to the particular column.

The face-plates of the dial are identical, each being provided, in effect, with a series of circumferentially-arranged columns and a series of radially-arranged columns. The surface of each plate is provided with a line 39, extending diametrically of the face and so positioned on the plate that when the dial is in normal equilibrium said mark will aline with the free edges of the respective fixed scale-strips. The face of the dial is divided by a series of concentrically-arranged lines into a series of annular spaces 40, and by a series of radially-projecting lines into a series of radially-arranged columns, said radial lines dividing the annular spaces to provide a series of regularly-disposed spaces. The annular spaces provided by the concentric lines are equal in width with the transversely-disposed columns of the scale-strip and are disposed so as to respectively register with said columns. The annular space 41 between the periphery of the face-plate 8 and the first concentric line of said plate is suitably marked to indicate pounds and fractions of pounds progressing regularly from said diametric line 39 throughout said surface of the dial-plate. The marks indicating the pounds are disposed in alinement with the radial divisions hereinbefore referred to, so that any number of said pound-marks may be caused in the movement of the dial to register with the free edge of the fixed scale, and thereby indicate a certain number of pounds supported on the platform, as will hereinafter appear. Each of the annular spaces 40 are marked to indicate price-marks, the particular symbol being in radial alinement with any one of the pound-marks on the dial, indicating the price of the number of pounds at a price per pound noted in the pound-price space on the fixed scale registering with the particular annular space on the dial. Thus, for example, the annular space on the dial registering with the pound-price column on the fixed scale bearing the price-mark 22 will have in radial alinement with each of the pound-marks on the dial a price amount corresponding to the particular number of pounds at twenty-two cents per pound. This arrangement of the annular and radial spaces is similar throughout the face of the dial, so that the user of the scale, knowing the price per pound at which the article is to be sold, can at once determine the total cost of the article being weighed by consulting the price-mark exposed on the dial-surface in alinement with the particular pound-price space on the fixed scale. The scale-dial will of course indicate at the same time the number of pounds or fractions thereof and the total cost of said pounds at any price per pound indicated upon the fixed scale; but as said dial is of necessity limited in its capacity provision is made whereby additional counterpoise may be used with equal facility. For example, assuming the capacity of the dial is to be limited to five pounds, as shown, and the article to be weighed should exceed this amount, in this event a five-pound poise 24 is placed upon the holder 22, so that the article will move the dial to indicate only the weight of such article in excess of five pounds. Determining on the dial the value of such excess weight the user adds thereto the amount noted in the second column of the fixed scale, which is the value of five pounds at a particular price per pound, as previously described. By thus adding the amounts indicated in the five-pound column and on the dial at the proper points in accordance with the price per pound the entire cost of the article is quickly and readily determined.

It is of course to be understood that the fixed scale may contain any desired number of vertically-arranged columns, indicating a multiple of the pound-price column, and that said pound-price column may, if preferred, be arranged to indicate any number of varying prices, so that practically any amount of material may be weighed upon the scale and its total cost price quickly determined in the manner stated.

Having thus described the invention, what is claimed as new is—

1. A computing-scale comprising a scale-beam, a platform supported thereby, a dial-casing, a dial rotatably supported within the casing and comprising face-plates and a framework upon which said face-plates are secured, a portion of said framework being enlarged to provide a counterbalance for the dial, and a connection between the scale-beam and framework.

2. A computing-scale comprising a scale-beam, a platform supported thereby, a dial-casing, a dial rotatably supported within the casing and comprising face-plates and a framework upon which said face-plates are secured, a portion of said framework being enlarged to provide a counterbalance for the dial, and a series of connected links providing a flexible connection between the scale-beam and framework, one end of said connection being secured to the adjacent end of the scale-beam and the opposite end thereof secured to the framework above the support of the latter.

3. A computing-scale comprising a scale-beam, a platform supported thereby, a dial-casing, a dial rotatably supported within the casing and comprising face-plates and a framework upon which said face-plates are secured, a portion of said framework being enlarged to provide a counterbalance for the dial, and a series of connected links providing a flexible connection between the scale-beam and framework, one end of said connection being secured to the adjacent end of the scale-beam and the opposite end thereof secured to the framework above the support of the latter, the face-plates of the dial being divided above and below the center into a series of radially-disposed columns, and a casing being formed with sight-openings to permit the exposure of a predetermined number of said columns above and below the center of the casing in any position of the dial.

4. A computing-scale comprising a scale-beam, a platform supported thereby, a dial-casing, a dial rotatably supported within the casing and comprising face-plates and a framework upon which said face-plates are secured, a portion of said framework being enlarged to provide a counterbalance for the dial, and a series of connected links providing a flexible connection between the scale-beam and framework, one end of said connection being secured to the adjacent end of the scale-beam and the opposite end thereof secured to the framework above the support of the latter, the face-plates of the dial being divided above and below the center into a series of radially-disposed columns, and a casing being formed with sight-openings to permit the exposure of a predetermined number of said columns above and below the center of the casing in any position of the dial, the opposing edges of the respective sight-openings being provided with fixed scale-strips formed on their relatively free edges with a series of indicating-numbers.

In testimony whereof I affix my signature in presence of two witnesses.

WILLIAM E. BURKS.

Witnesses:
  ROSE RUGGLES,
  JOHN S. HAGER.